(12) United States Patent
Shimizu

(10) Patent No.: US 6,243,541 B1
(45) Date of Patent: Jun. 5, 2001

(54) IMAGE READER AND PRINTING SYSTEM

(75) Inventor: Yasuyuki Shimizu, Kawasaki (JP)

(73) Assignee: Fuji Xerox Co., Ltd., Tokyo (JP)

( * ) Notice: Subject to any disclaimer, the term of this patent is extended or adjusted under 35 U.S.C. 154(b) by 0 days.

(21) Appl. No.: 09/453,695

(22) Filed: Dec. 3, 1999

(30) Foreign Application Priority Data

Dec. 9, 1998 (JP) ................................. 10-349408

(51) Int. Cl.$^7$ .................................................. G03G 15/00
(52) U.S. Cl. ........................... 399/17; 358/448; 358/462; 399/14; 399/366
(58) Field of Search ................................. 399/14, 16, 17, 399/42, 81, 85, 366, 367, 370; 382/112, 229; 358/448, 449, 462

(56) References Cited

U.S. PATENT DOCUMENTS 5,604,596 * 2/1997 Ukai et al. ..................... 399/366 X
5,640,647 * 6/1997 Hube .............................. 399/366 X
5,905,935 * 5/1999 Wakamatsu et al. ................. 399/407

FOREIGN PATENT DOCUMENTS 5-56220   3/1993 (JP) .
6-139329  5/1994 (JP) .
9-102853  4/1997 (JP) .

* cited by examiner

Primary Examiner—Sophia S. Chen
(74) Attorney, Agent, or Firm—Oliff & Berridge, PLC

(57) ABSTRACT

An image reading is executed to only specific originals among plural originals. An original information detecting part detects original information on each original based on the result of prescanning. A judging part, based on copying conditions set by a user, judges whether the original information meets the copying conditions or not and determines the necessity of copying accordingly. An operation control part controls respective constitutions based on the result of judging of necessity. According to this device, for example, only color originals can be copied or only originals having a specific size can be copied. Furthermore, only originals present between colored partition papers can be copied.

11 Claims, 4 Drawing Sheets

IMAGE READER AND PRINTING SYSTEM

BACKGROUND OF THE INVENTION

1. Field of the Invention

This invention relates to an image reader and a printing system, and more particularly to a printing control executed responsive to the property of an image.

2. Description of the Related Arts

As the image reader, a digital copying machine, a scanner, a composite device which is composed of these devices or the like is considered. Such an image reader is provided with an automatic original transfer mechanism which is generally called as an automatic document feeder (ADF). With the ADF, an original is supplied onto a platen one by one out of plural originals which are set in the ADF, while the original from which the image is read is discharged one by one.

Among digital copying machines, there is a type of digital copying machine which automatically recognizes information on the property of the original (hereinafter called as 'original information') based on a prescanned image obtained by a prescanning, and responsive to such original information, parameters necessary at the time of main scanning or parameters necessary at the time of processing the image read by main scanning are set. Using such a function, various information on, for example, the color, the size, the density, the contrast and the like of the original can be obtained. In the conventional device, however, the fact is that such a function is not effectively used in other applications.

Conventionally, for example, in executing an automatic copying of plural originals by means of the above-mentioned digital copying machine, it is impossible to automatically exclude a specific original out of plural originals from objects to be copied. Accordingly, in case an original which a user does not wish copying thereof is present among a large number of originals, for example, the user must take out such an original in advance before copying and insert the original to the same position after copying, or all originals must be copied first and then unnecessary copied papers must be removed from all the copied papers thus bringing about a cumbersome copying operation.

In view of the above-mentioned problems, Japanese laid-open patent publication Hei 5-56220 discloses a device which executes prescanning of each original at the time of executing copying of plural originals set in the ADF and if it is judged the original is a white paper original, an alarm display is performed so as to prevent copying thereof. In such a device, however, it is necessary to give a direction always manually to perform the alarm display.

Japanese laid-open patent publication Hei 9-102853 discloses a device in which a user gives a direction and sets whether main scanning should be executed or not based on the result of prescanning. In such a device, the user must give his direction on whether reading of the original should be executed or not one by one on each original. Furthermore, although Japanese laid-open patent publication Hei 6-139329 discloses an automatic detection of sizes of originals, no reference is made to the judgement on whether reading should be executed or not.

SUMMARY OF THE INVENTION

The present invention has been made in view of the above problems and provides an image reader that automatically determines an image to be read, thus resolving the cumbersome processing on a user side.

The image reader of the present invention also effectively makes use of an existing image information detection function so as to automatically execute the judgement on whether reading should be executed or not on each original.

The present invention also provides a printing system that automatically prints only desired images responsive to the property of images, thus resolving the cumbersome processing on a user side.

The printing system of the present invention also has a proper printing part automatically operated responsive to the property of the image, thus eliminating sorting of originals by the user in advance before copying.

The image reader of the present invention has an original transfer mechanism which transfers plural originals one by one, an image inputting part which reads an image of the transferred original, an original information detecting part which detects original information on the original which has become an object to be read in the image inputting part, and an acquisition necessity judging part which judges necessity of an image acquisition on the original based on the original information.

Due to such a construction, the original information is detected or recognized on each original and the necessity of the image acquisition is judged based on the original information. For example, the image reading is executed on only originals having a specific property. Furthermore, it is possible to skip reading of only these originals. The concept that image acquisition is unnecessary includes a case that even when the image is read, the image is not stored and a case that even when the image is read, the image is not used for printing.

According to the present invention, by merely setting the specific original information, only desired originals can be automatically read out of a large number of originals and hence, a sorting operation before or after the copying operation becomes unnecessary.

It is desirable that the original information detecting part detects the original information based on a prescanned image which is obtained by prescanning the original.

The original information includes, for example, the color information, the size information, the density information, the paper quality information, the content of the originals or the like. These information may be acquired by making use of an existing automatic original information detection function, OCR function, output values of various kinds of sensors or the like. The judging of image acquisition may be performed by making use of these pieces of information. In such a case, it is necessary to carefully select the originals from which images are read.

As described above, according to the present invention, the image reading of only color originals, the image reading of only originals having a specific size, the skipping of reading of black mat originals, the image reading of originals having a specific thickness or the like, the image reading of originals having rows of specific characters or characters of specific size and the like can be realized.

Although it is desirable that the present invention is applied to a digital copying machine, the present invention is applicable to other devices having other image reading functions.

According to another aspect of the present invention, the image reader has an original transfer mechanism which transfers plural originals one by one, an image inputting part which reads an image of the transferred original, an original information detecting part which detects original information on the original which has become an object to be read in the image inputting part, and an acquisition range judging part which judges a range in which an image acquisition is executed among the plural originals based on the original information.

Due to such a construction, making use of the original information acquired on one original, the necessity of image acquisition of other originals can be judged.

Here, it is preferable that the original information includes the acquisition start information and the acquisition end information and the acquisition range judging part judges the range in which the image acquisition is executed based on the acquisition start information and the acquisition end information. For example, in case colored partition papers are inserted at both sides of the original reading range, the color of the partition papers are automatically detected thus enabling the image acquisition only between these partition papers. In this case, the start partition paper and the end partition paper may differ in color.

As mentioned above, according to the present invention, in case an image reading is necessary or unnecessary on specific originals among plural originals set at the ADF, by setting these originals as the reading necessary originals or the reading unnecessary originals, the images of such originals are automatically acquired or excluded. In this case, the existing original information detection function is effectively utilized.

According to the present invention, as described above, it is possible to set the image reader such that only papers having a specific size are read or are not read or only colored originals are read or are not read, for example. As a result, a sorting operation for the originals to be read which has been conventionally necessary before or after reading becomes unnecessary and hence, only the image of the originals which are targeted can be read easily and rapidly.

The printing system of the present invention has an analyzing part which analyzes the content of an image, a judging part which judges necessity of printing of the image based on a result of analysis by the analyzing part, and a printing part which prints the image judged that the printing thereof is necessary by the judging part.

Due to such a construction, the necessity of printing can be judged on each image based on the analyzed result of the analyzing part and hence, when the printing system is preliminarily directed to execute or not to execute the printing based on a specific attribution (black and white, color or the like), the printing can be automatically executed on only a desired image. The image (image data) is generally acquired by an image reader or is received via a network.

According to another aspect of the present invention, the printing system has a black-and-white printing processing part which executes a printing processing of black-and-white images, a color printing processing part which executes a printing processing of color images, an analyzing part which analyzes the content of images, and a selection control part which selectively operates the black-and-white printing processing part or the color printing processing part on the images based on a result of analysis by the analyzing part.

Due to such a construction, the proper printing part can be selectively operated by specifying whether the image is a color image or a black-and-white image on each image. Accordingly, the color printing part and the black-and-white printing part can be properly operated thus realizing an efficient printing processing.

BRIEF DESCRIPTION OF THE DRAWING

The accompanying drawings which are incorporated in and constitute a part of this specification, illustrate several embodiments of the invention and, together with the description, serve to explain the principles of this invention.

DESCRIPTION OF THE PREFERRED EMBODIMENT

Preferred embodiments of this invention are explained in detail in conjunction with attached drawings.

Figure 1:
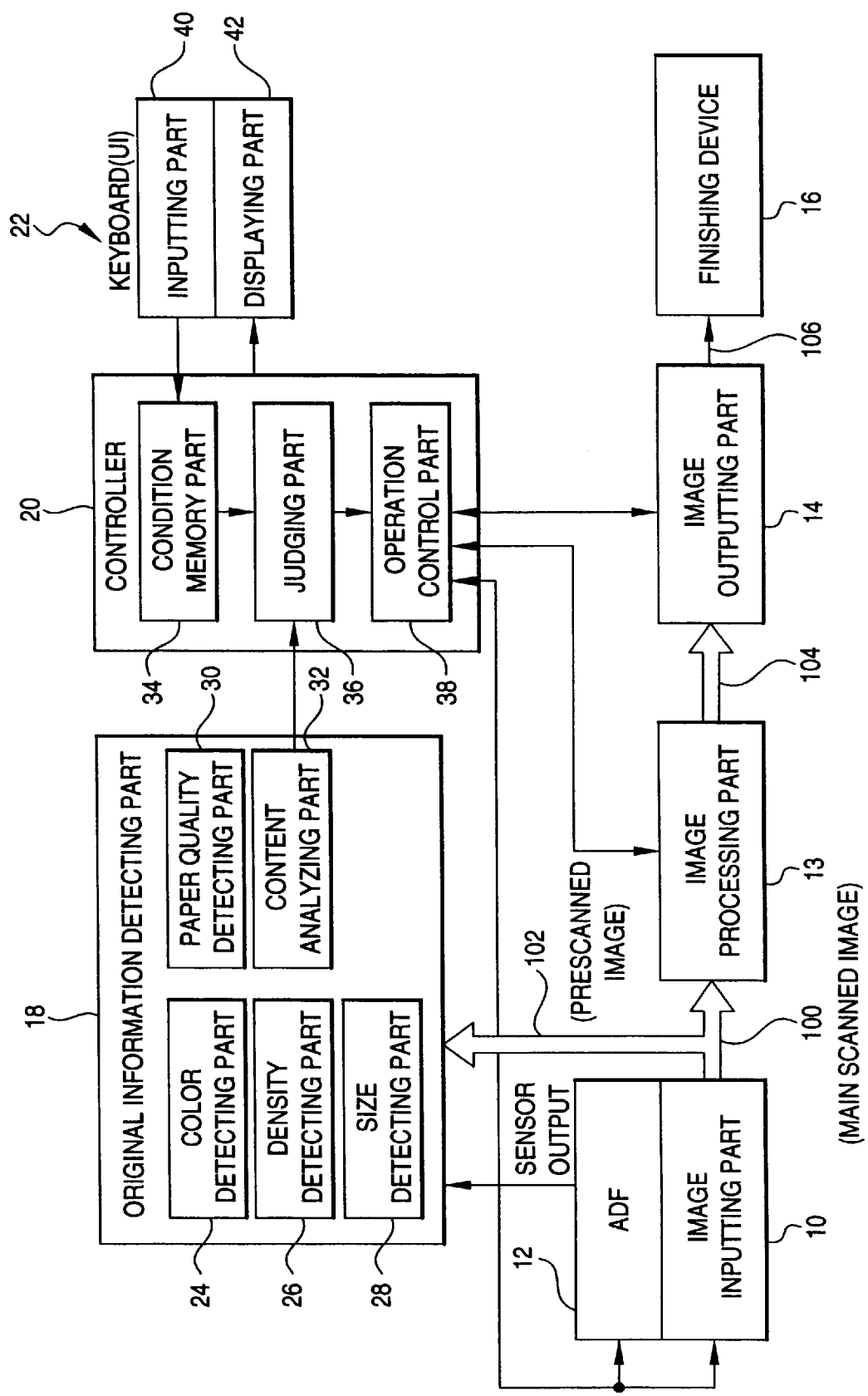
FIG. 1 is a block diagram showing a preferred embodiment of an image reader according to the present invention.

FIG. 1 shows a preferred embodiment of an image reader according to the present invention and FIG. 1 is a block diagram showing an entire construction thereof. The image reader according to this embodiment is a digital copying machine, for example.

In FIG. 1, an image inputting part 10 is a device for reading an image of an original placed on a platen not shown in the drawing. The original image is transferred to an image processing part 13 as digital information.

An automatic document feeder (ADF) 12 is a device which transfers the original onto the platen one by one from plural originals set in the ADF and transfers the original which reading is finished to a given tray.

The image reader of this embodiment has a function of executing a prescanning prior to an image reading by a main scanning. In FIG. 1, the flow of an image data read by the main scanning is indicated by numeral 100, while the flow of an image data read by the prescanning is indicated by numeral 102.

An image processing part 13 executes an image processing on the image data 100. For example, various kinds of processing such as the rotation, the enlargement, the shrinking and the like are executed on the image data. It is needless to say that such processings are executed in case of necessity and hence, the present invention is also applicable to a device which is not provided with the image processing part 13.

Image data obtained after the image processing is indicated by numeral 104 and such image data 104 is fed to an image outputting part 14. The image outputting part 14 is a device which executes a processing to print the image onto a printing paper after the image processing. The flow of the paper on which printing is completed is indicated by numeral 106. A finishing device 16 is a device for executing a finishing processing such as a staple processing or a punch processing or the like to the paper on which printing is completed.

In this embodiment, an original information detecting part 18 detects original information on an original which constitutes a reading object based on the image data 102 obtained by the prescanning. In the conventional device, the original information are utilized for setting parameters in the image processing. In this embodiment, however, in addition to such a utilization mode, the original information can be utilized as information for judging the necessity of copying the original information. This matter is described in detail later.

A color detecting part 24 detects the color of the original based on the prescanned result and such a prescanned result is realized as an automatic original color recognition function (ACS). In the same manner, a density detecting part 26 detects the density of the original based on the prescanned result, and a size detecting part 28 detects the size of the original based on the prescanned result.

A paper quality detecting part 30 detects a thickness of the original, for example, and the thickness is detected based on the prescanned result or is detected based on an output of a given sensor or the like. A content analyzing part 32 analyzes characters contained in the original, for example, and such an analysis is realized by a known OCR (optical character recognition) function. For example, with such a content analyzing part 32, it is possible to judge whether rows of specific characters are present or not, or whether characters having a specific size are present or not. Incidentally, these various functions are realized by either software or hardware.

The size of the original or the density of the original or the like may not be based on the prescanned result and may be based on information obtained from the output of sensor mounted on the ADF 12 or the image inputting part 10.

A controller 20 is a device which performs the whole control of the image reader. According to this embodiment, particularly, the controller 20 has a function of judging the necessity of copying of each original. To be more specific, a condition memory part 34 is constituted by a memory such as a RAM, for example and copying conditions inputted by a user are stored in the condition memory part 34.

The judging part 36 judges whether copying conditions are met or not based on various original information outputted from the original information detecting part 18. In this manner, the necessity of copying is judged. An operation control part 38 performs an operation control of various constitutions. According to this embodiment, in case it is judged that copying is necessary, the direction to execute reading of the image, that is, the main scanning is sent to the image inputting part 10. It is needless to say that copying of originals other than targeted object can be excluded by stopping the processing of the image processing part 13 or the printing operation of the image outputting part 14.

According to this embodiment, a keyboard (U1) 22 is constituted by an inputting part 40 and a display part 42. To be more specific, the keyboard 22 is composed of a touch panel or the like. Various kinds of operation contents and messages are indicated on the display part 42 and inputting of copying conditions or the like can be performed using this inputting part 40.

Making use of the inputting part 40, plural copying conditions are combined under an AND condition or an OR condition and these conditions are defined as a copying condition as a whole. Making use of a NOT condition, copying may be performed only when the condition is not met.

Accordingly, due to such a construction, copying can be performed on only color originals, originals having a specific size, or color originals having a specific size. Furthermore, due to such a construction, by setting originals having a density not more than a predetermined density as copying objects, a black mat original can be excluded from copying objects, or by setting originals having a thickness not more than a predetermined thickness as copying objects, a front cover or a back cover can be excluded from copying objects. Furthermore, only originals having rows of specific characters or characters having a specific size can be set as copying objects and hence, only one or plural specific originals can be automatically recognized out of a group of originals set in the ADF 12 and the copying processing is executed on these originals.

Figure 2:
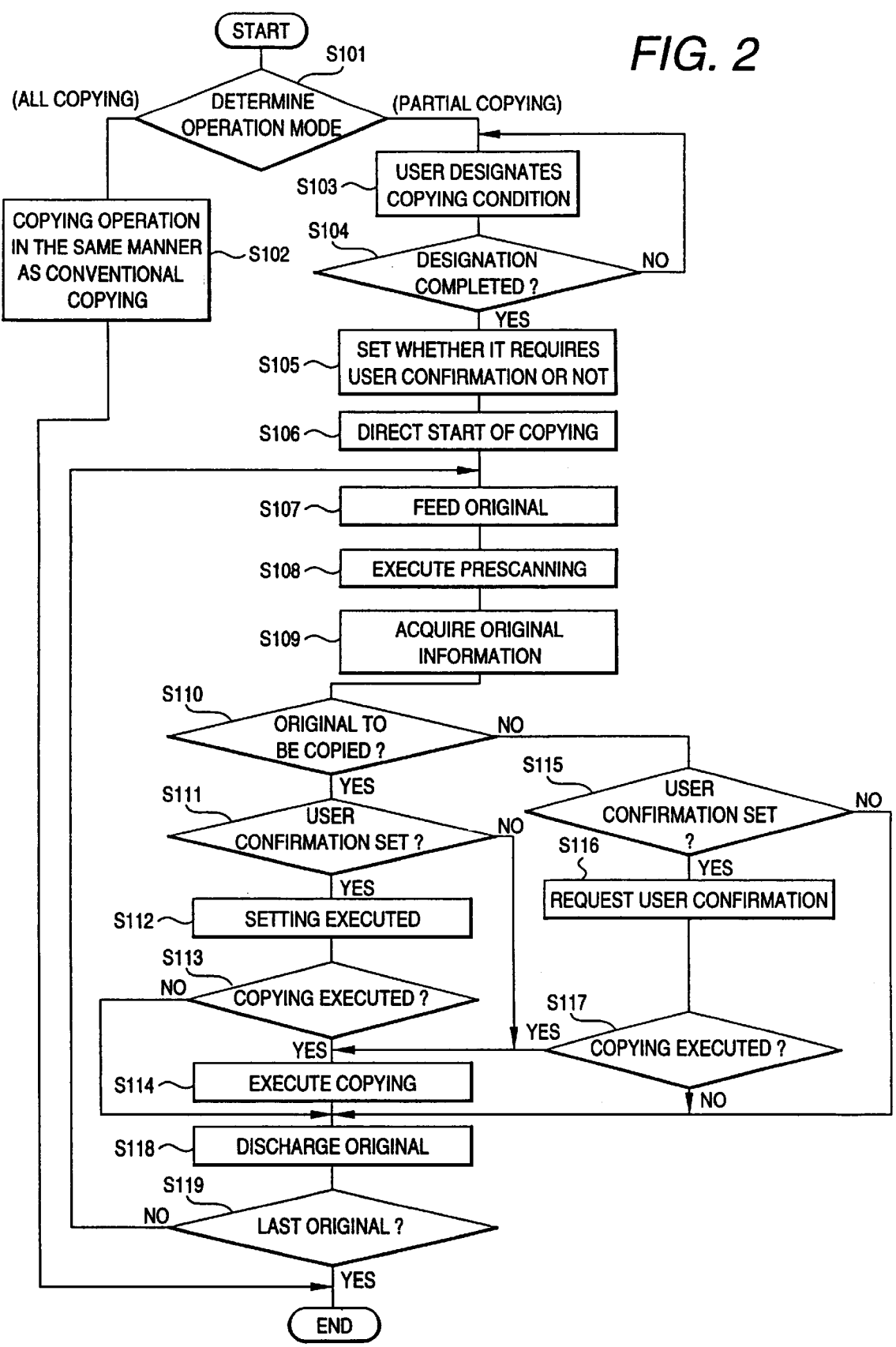
FIG. 2 flow chart showing an example of an operation of the device shown in FIG. 1.

Subsequently, in FIG. 2, an example of manner of operation of the device shown in FIG. 1 is shown as a flow chart. In step S101, it is determined whether copying is performed in a normal total copying mode or a partial copying mode according to this embodiment. In case the mode is determined to be the normal copying mode, in step S102, the original is transferred onto the platen one by one as in the case of the conventional copying and hence, copying of each original is executed one by one.

On the other hand, in case it is determined that the mode which executes copying of only specific originals is set, in step S103, using the inputting part 40, copying conditions are registered by the user. For example, various copying conditions such as printing of only color originals and printing of originals other than color originals are registered. In step S104, in case it is determined that the registration of the conditions is completed, in step S105, setting of whether the necessity judging result is to be displayed on each original so as to require a user to confirm the result or not is executed. That is, setting of the necessity of user confirmation is executed.

In step S106, inputting of a start of copying is executed by a user and in step S107, one sheet of original is fed onto the platen by means of the ADF 12. In step S108, prescanning is executed on the original by the operation of the image inputting part 10 and in step S109, the prescanned result is outputted to the original information detecting part 18.

In step S110, based on the detected result of the original information detecting part 18, the judging part 36 judges whether the original is an original to be copied or not based on the registered copying conditions. In this case, if it is judged that the original is an original to be copied, in step S111, it is judged whether the user confirmation is set in step S105. If the user confirmation is set, in step S112, a message which requests the user confirmation is displayed on the displaying part 42 so that inputting of the user confirmation is executed by the user.

In step S113, when it is judged that the user confirmation is obtained, in step S114, copying is executed. That is, in the image inputting part 10, the main scanning is executed so that the image is printed on the paper as described previously. original information maybe detected by making use of the result of the main scanning without executing the prescanning.

In step S110, when it is judged that the original is an original which should not be copied, in step S115, it is judged whether the user confirmation is set or not. If setting of the user confirmation is executed, in step S116, the user confirmation is requested as in the case of step S112. Then, in step S117, when it is judged that the user confirmation is obtained, step S118 is executed. On the other hand, when the user inputs a direction to execute copying, copying is executed in step S114.

In step S118, the original on the platen is discharged and in step S119, the above-mentioned respective steps starting from step S117 are repeated except for a case that it is judged that the original is the last original.

Figure 3:
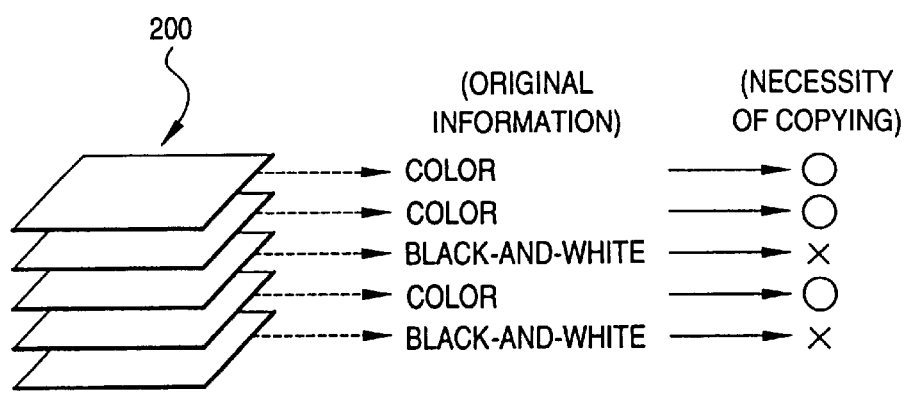
FIG. 3 is a conceptual view showing an example of operation of the device.

In FIG. 3, an example of operation of the image reader is conceptually shown. For example, with respect to a group of originals 200, as a result of prescanning on each original, the judging whether the original is a color original or a black-and-white original is executed on each original. Thereafter, for example, copying of only color originals is executed.

Figure 4:
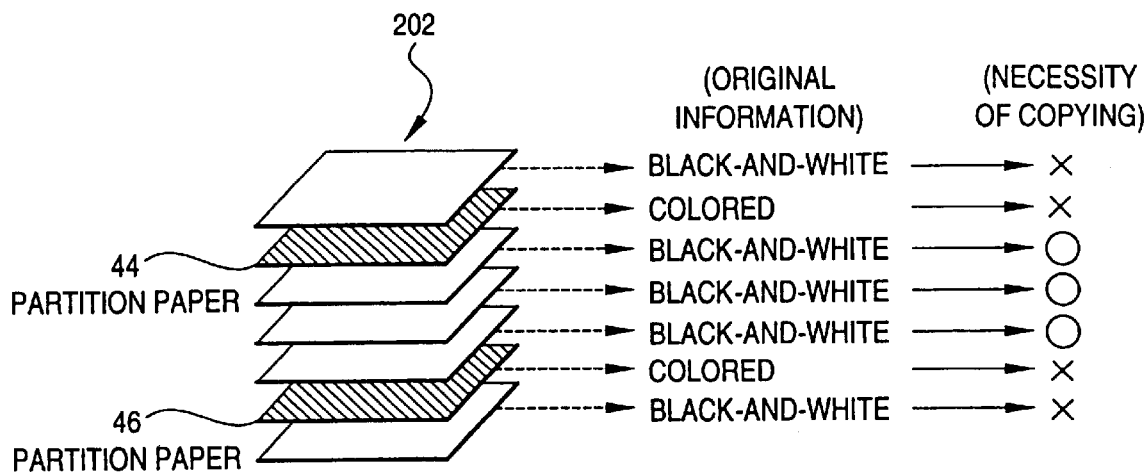
FIG. 4 is a conceptual view showing an example of operation of the device.

As shown in FIG. 4, as an expanded utilization of the above-mentioned function, a condition may be set such that only one or more originals which are sandwiched between partition papers 44, 46 are copied. In FIG. 4, the partition papers 44, 46 are inserted in a group of originals 202 at both sides of one or more originals to be copied and these partition papers 44, 46 are judged to be colored originals by the original information detecting part 18. Then, it is judged that copying is to be executed only on the normal white color originals disposed between the colored originals.

Different colors may be applied to the partition papers which indicates the start and the partition paper which indicates the end respectively. With such a handling, an erroneous inserting operation of the partition papers by the user can be prevented.

Figure 5:
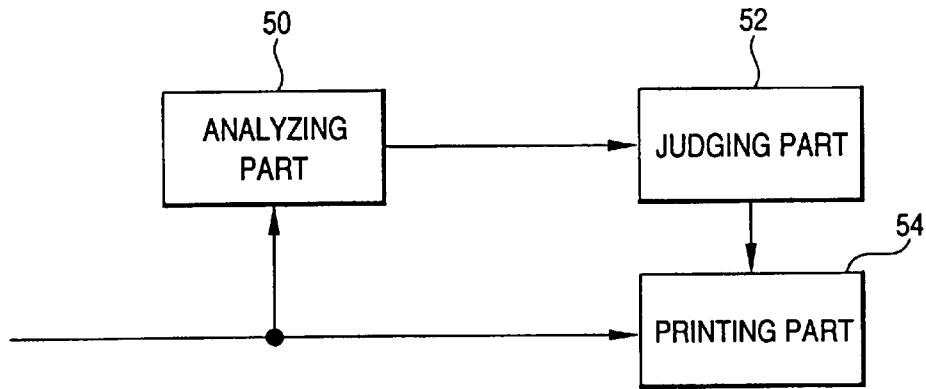
FIG. 5 is a structural view of an essential part of a system for executing a printing of images.
Figure 6:
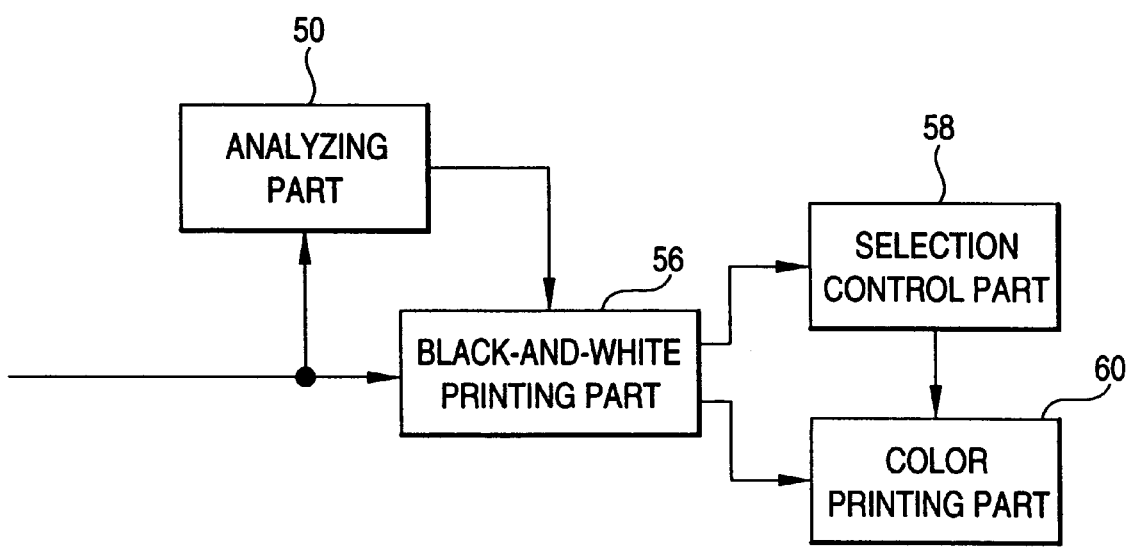
FIG. 6 is a structural view of an essential part of another system for executing a printing of images.

FIG. 5 and FIG. 6 show the construction of essential parts of a printing system according to another embodiment of the present invention. Such a printing system constitutes a print server which is connected to a digital copying machine or a network.

In FIG. 5, an image read by an image inputting part or an image (image data) received by way of a network is sent to a printing part 54 and printing of the image is executed by the printing part 54. In this printing system, however, the content of each image is analyzed by an analyzing part 50. For example, in the analyzing part 50, it is analyzed whether the image is a color image or a black-and-white image. A judging part 52 judges the necessity of printing on each image based on the result of the analysis and in case printing is necessary, the judging part 52 outputs a signal indicative of this judging to a printing part 54. Accordingly, the printing part 54 executes printing of only color images, for example. The analyzing part may have the similar construction as that of the original information detecting part 18 shown in FIG. 1 or may interpret the page description language. In the latter case, the analyzing part is disposed as a preceding step of the printing part and judging of the necessity of printing is executed based on the result of the analysis of the page description language executed prior to printing. According to the construction shown in FIG. 5, it is unnecessary for a user to designate the necessity of printing on each image and hence, the burden of the user can be reduced as in the case of the above-mentioned embodiment.

In FIG. 6, each image is analyzed in an analyzing part 50 as in the case of the previous embodiment and particularly, it is judged whether the image is a color image or a black-and-white image. The result of the analysis is sent to a selection control part 56. Out of a black-and-white printing part 58 and a color printing part 60, depending on the property of the image, the selection control part 56 sends the image to the printing part which meets the property of the image and selectively operates the printing part. Accordingly, due to such a construction, the black-and-white image and the color image can be respectively printed by their exclusive printing parts so that the printing efficiency and the printing quality are enhanced. Furthermore, it is unnecessary for the user to preliminarily execute sorting (designation of attribution) on each image and hence, the burden of the user can be reduced.

As has been described heretofore, according to the present invention, originals which require reading or printing can be automatically judged and hence, the user is set free from the cumbersome processing at user side. Furthermore, according to the present invention, by making use of the existing function of detecting original information, the necessity of reading can be automatically judged on each original. Furthermore, according to the present invention, a rational printing system is provided.

What is claimed:

1. An image reader comprising:

an original transfer mechanism which transfers a plurality of originals one by one;

an image inputting part which reads an image of the transferred original;

an original information detecting part which detects original information on the original which has become an object to be read in the image inputting part; and an acquisition necessity judging part which judges necessity of an image acquisition on the original based on the original information;

wherein the original information detecting part detects the original information based on a prescanned image which is obtained by prescanning the original.

2. The image reader according to claim 1, wherein the original information detecting part detects color information of the original.

3. The image reader according to claim 1, wherein the original information detecting part detects size information of the original.

4. The image reader according to claim 1, wherein the original information detecting part detects density information of the original.

5. The image reader according to claim 1, wherein the original information detecting part detects paper quality information of the original.

6. The image reader according to claim 1, wherein the original information detecting part detects the content of the original.

7. The image reader according to claim 6, wherein the acquisition necessity judging part judges the necessity of the image acquisition based on the presence of particular parameters in the original.

8. An image reader comprising:

an original transfer mechanism which transfers a plurality of originals one by one;

an image inputting part which reads an image of a transferred original;

an original information detecting part which detects original information on the original which has become an object to be read in the image inputting part; and an acquisition range judging part which judges a range in which an image acquisition is executed among the plurality of originals based on the original information.

9. The image reader according to claim 8, wherein the original information includes acquisition start information and acquisition end information, and the acquisition range judging part judges the range in which the image acquisition is executed based on the acquisition start information and the acquisition end information.

10. A printing system comprising:

an analyzing part which analyzes the content of an image;

a judging part which judges necessity of printing of the image based on a result of analysis by the analyzing part; and a printing part which prints the image which is judged that the printing thereof is necessary by the judging part and wherein the printing part includes a black-and-white printing processing part which executes a printing processing of black-and-white images;

a color printing processing part which executes a printing processing of color images.

11. A printing system comprising:

a black-and-white printing processing part which executes a printing processing of black-and-white images;

a color printing processing part which executes a printing processing of color images;

an analyzing part which analyzes the content of images; and a selection control part which selectively operates the black-and-white printing processing part or the color printing processing part on the images based on a result of analysis by the analyzing part.

* * * * *